United States Patent
Ikeda et al.

(10) Patent No.: US 8,159,906 B2
(45) Date of Patent: Apr. 17, 2012

(54) ADDRESS GENERATING AND DETECTING METHOD AND REPRODUCING AND RECORDING APPARATUS

(75) Inventors: Masakazu Ikeda, Odawara (JP); Akio Fukushima, Yokohama (JP); Koichi Hirose, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 193 days.

(21) Appl. No.: 12/606,536

(22) Filed: Oct. 27, 2009

(65) Prior Publication Data
US 2010/0214885 A1    Aug. 26, 2010

(30) Foreign Application Priority Data
Feb. 24, 2009    (JP) ................. 2009-040137

(51) Int. Cl.
*G11B 21/08*    (2006.01)
(52) U.S. Cl. .............. 369/30.01; 369/30.03; 369/30.18; 369/47.22; 369/59.25
(58) Field of Classification Search .............. 369/30.01, 369/30.03, 30.18, 47.22, 59.25
See application file for complete search history.

(56) References Cited

U.S. PATENT DOCUMENTS

| | | | | |
|---|---|---|---|---|
| 2003/0103429 A1* | 6/2003 | Senshu | ........................ | 369/47.24 |
| 2003/0112725 A1* | 6/2003 | Kobayashi et al. | ......... | 369/47.22 |
| 2003/0128640 A1* | 7/2003 | Schep et al. | ............... | 369/47.31 |
| 2004/0174802 A1 | 9/2004 | Suzuki | | |
| 2004/0264694 A1 | 12/2004 | Kim et al. | | |
| 2008/0117753 A1* | 5/2008 | Kwon et al. | ............... | 369/47.15 |
| 2008/0117793 A1* | 5/2008 | Kwon et al. | ............... | 369/275.3 |
| 2009/0175151 A1* | 7/2009 | Miyashita et al. | ........ | 369/112.23 |
| 2009/0180361 A1* | 7/2009 | Nakata et al. | .............. | 369/30.18 |

FOREIGN PATENT DOCUMENTS

| | | |
|---|---|---|
| JP | 03-219440 A | 9/1991 |
| JP | 11-273261 A | 10/1999 |
| JP | 2008-041243 | 2/2008 |
| WO | 0154119 A2 | 7/2001 |
| WO | 2006061727 A1 | 6/2006 |
| WO | 2006061736 A1 | 6/2006 |
| WO | 2008060103 A1 | 5/2008 |
| WO | 2008060104 A1 | 5/2008 |
| WO | 2009066453 A1 | 5/2009 |
| WO | 2009066470 A1 | 5/2009 |

OTHER PUBLICATIONS

European Search Report issued in European Patent Application No. EP 09 17 4246, mailed Apr. 23, 2010.
Japanese Office Action, with English translation, issued in Japanese Patent Application No. 2009040137, dated Oct. 25, 2011.

* cited by examiner

*Primary Examiner* — Wayne Young
*Assistant Examiner* — Brenda Bernardi
(74) *Attorney, Agent, or Firm* — McDermott Will & Emery LLP

(57) ABSTRACT

Recording capacity per layer is detected from a disc and bit allocation of wobble addresses in a conventional optical disc and bit allocation in a high-density optical disc are controlled selectively to detect physical position addresses on the disc. Address detection can be performed for two kinds of discs which are equal in structure of addresses embedded in wobbles but different in bit allocation of addresses.

8 Claims, 17 Drawing Sheets

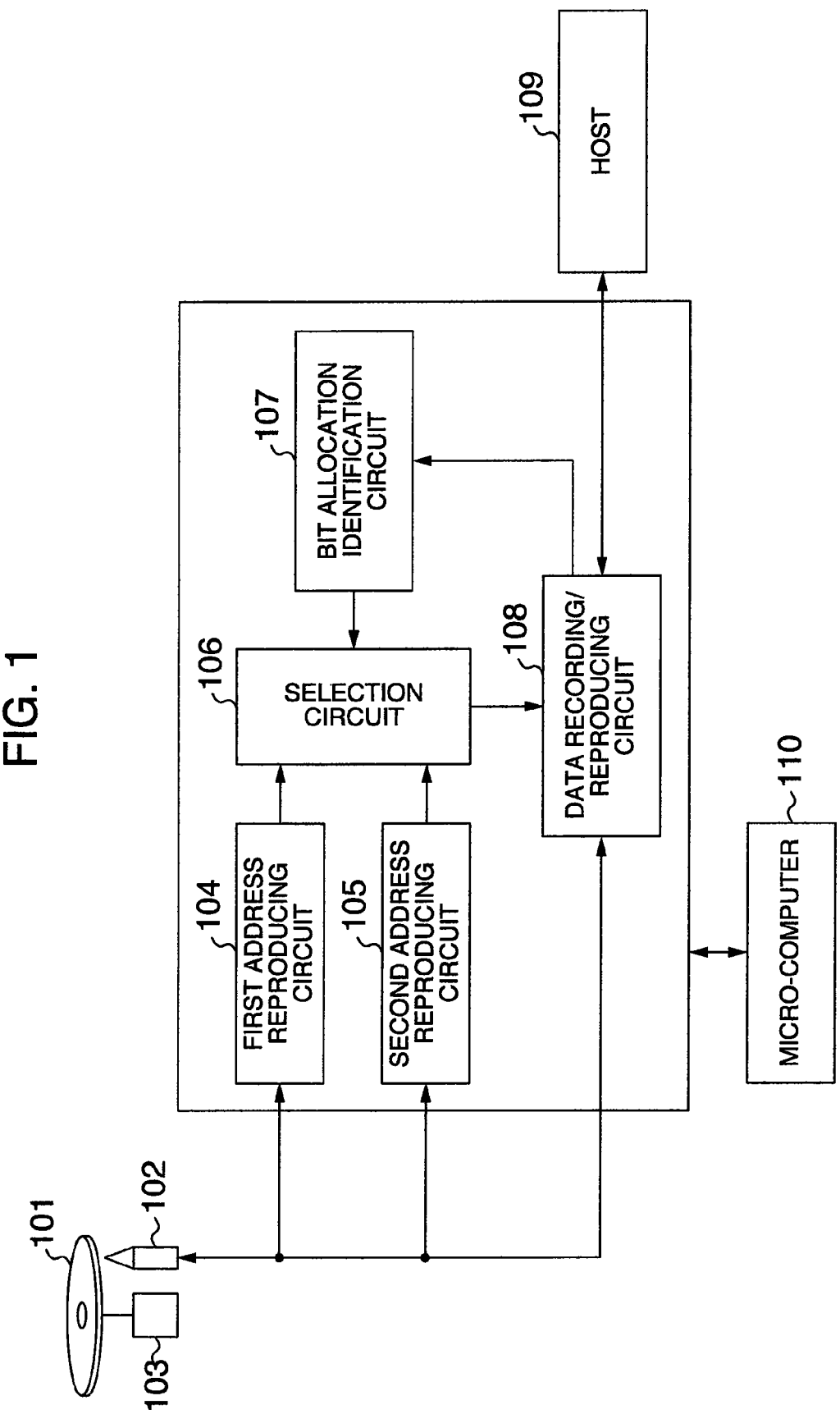

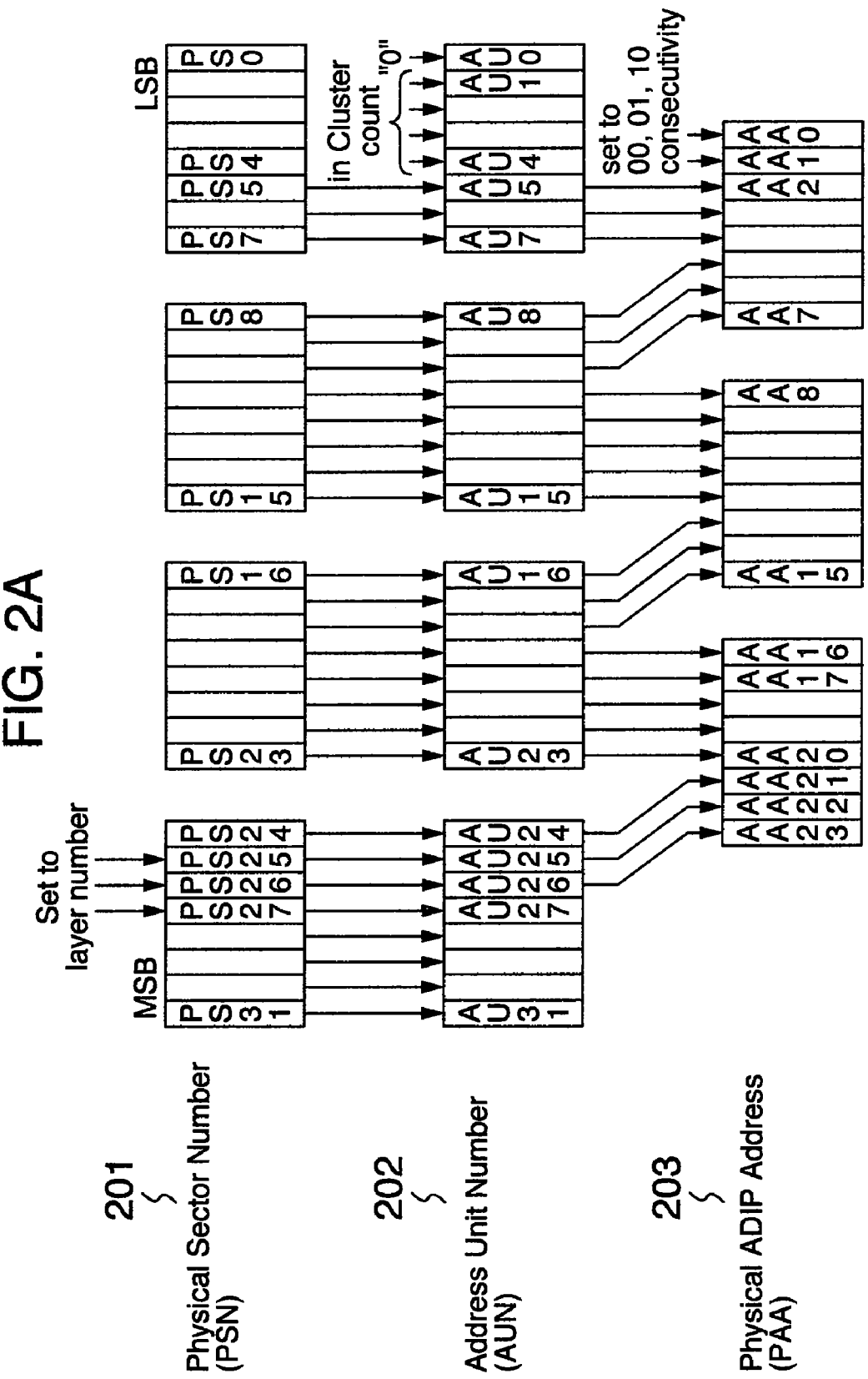

FIG. 2B

| | layer number | sequence number | intra-RUB number |
|---|---|---|---|
| $PAA_0$ on L0 | $AA23 \cdots AA21 = 000$ | $AA20 \cdots AA2$ | $AA1, AA0 = 00, 01, 10$ from inside to outside |
| $PAA_1$ on L1 | $AA23 \cdots AA21 = 001$ | $\overline{AA20 \cdots AA2}$ | $AA1, AA0 = 00, 01, 10$ from inside to outside |

FIG. 3B

| | layer number | sequence number | intra-RUB number |
|---|---|---|---|
| PAA₀ on L0 | AA23, AA22 = 00 | AA21 · · AA2 | AA1,AA0 = 00,01,10 from inside to outside |
| PAA₁ on L1 | AA23, AA22 = 01 | $\overline{AA21}$ · · $\overline{AA2}$ | AA1,AA0 = 00,01,10 from inside to outside |
| ····· | ····· | ····· | ····· |

FIG. 4B

| | layer number | sequence number | intra-RUB number |
|---|---|---|---|
| PAA$_0$ on L0 | AA24··AA22 = 000 | AA21··AA2 | AA1,AA0 = 00,01,10 from inside to outside |
| PAA$_1$ on L1 | AA24··AA22 = 001 | $\overline{AA21}$··$\overline{AA2}$ | AA1,AA0 = 00,01,10 from inside to outside |
| ..... | ..... | ..... | ..... |

FIG. 5B

| | layer number | sequence number | intra-RUB number |
|---|---|---|---|
| PAA$_0$ on L0 | AA24 ·· AA22 = 000 | AA21 ·· AA2 | AA1,AA0 = 00,01,10 from inside to outside |
| PAA$_1$ on L1 | AA24 ·· AA22 = 001 | $\overline{AA21}$ ·· $\overline{AA2}$ | AA1,AA0 = 00,01,10 from inside to outside |
| ····· | ····· | ····· | ····· |

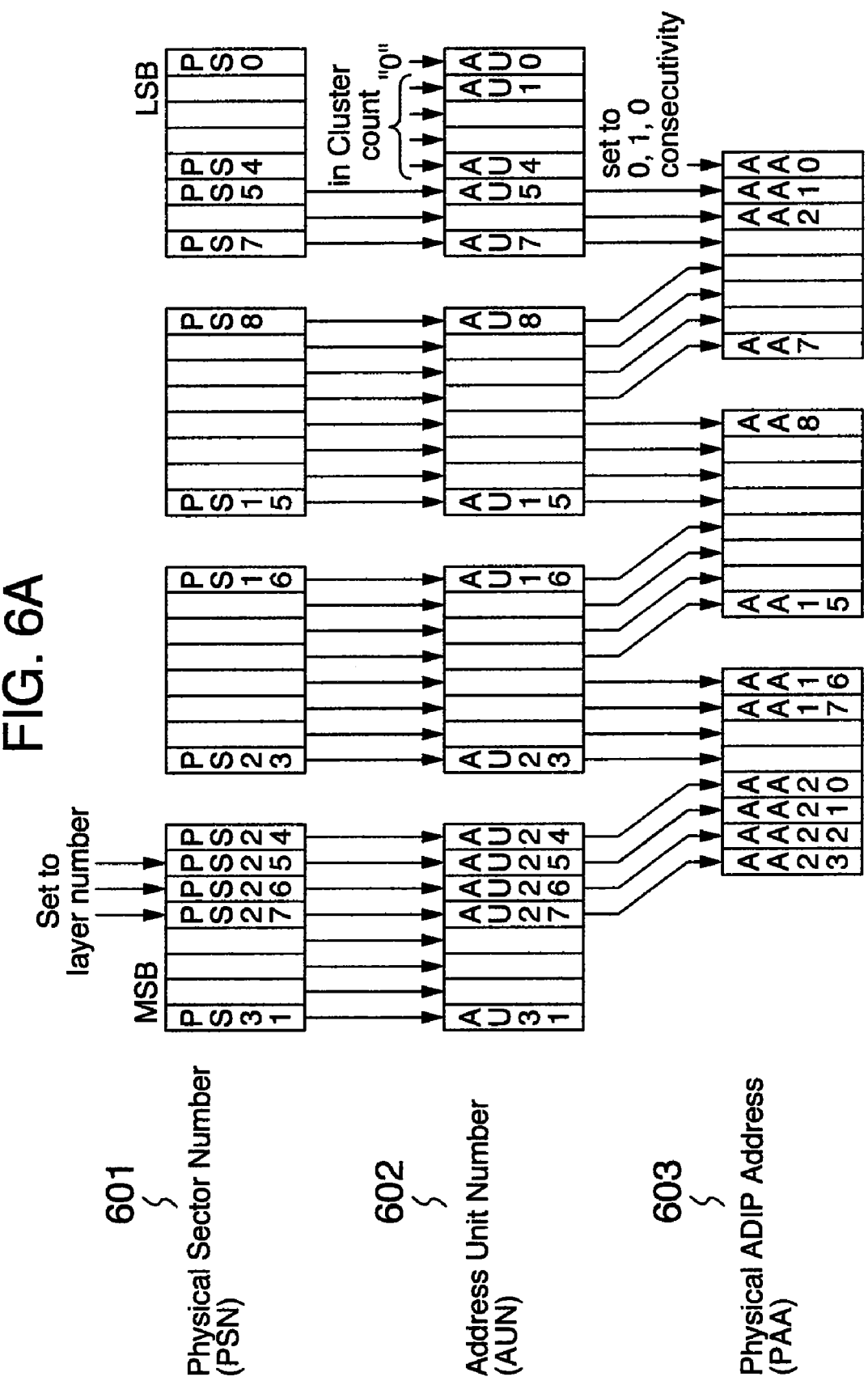

FIG. 6B

| | layer number | sequence number | intra-RUB number |
|---|---|---|---|
| $PAA_0$ on L0 | $AA23 \cdots AA2 = 000$ | $AA20 \cdots AA1$ | AA0 = 0,1,0 from inside to outside |
| $PAA_1$ on L1 | $AA23 \cdots AA2 = 001$ | $\overline{AA20} \cdots \overline{AA1}$ | AA0 = 0,1,0 from inside to outside |
| ····· | ····· | ····· | ····· |

FIG. 7B

| | layer number | sequence number | intra-RUB number |
|---|---|---|---|
| PAA$_0$ on L0 | AA24··AA22 = 000 | AA21··AA2 | AA1,AA0 = 00,01,10 from inside to outside |
| PAA$_1$ on L1 | AA24··AA22 = 001 | $\overline{AA21}$··$\overline{AA2}$ | AA1,AA0 = 00,01,10 from inside to outside |
| ····· | ····· | ····· | ····· |

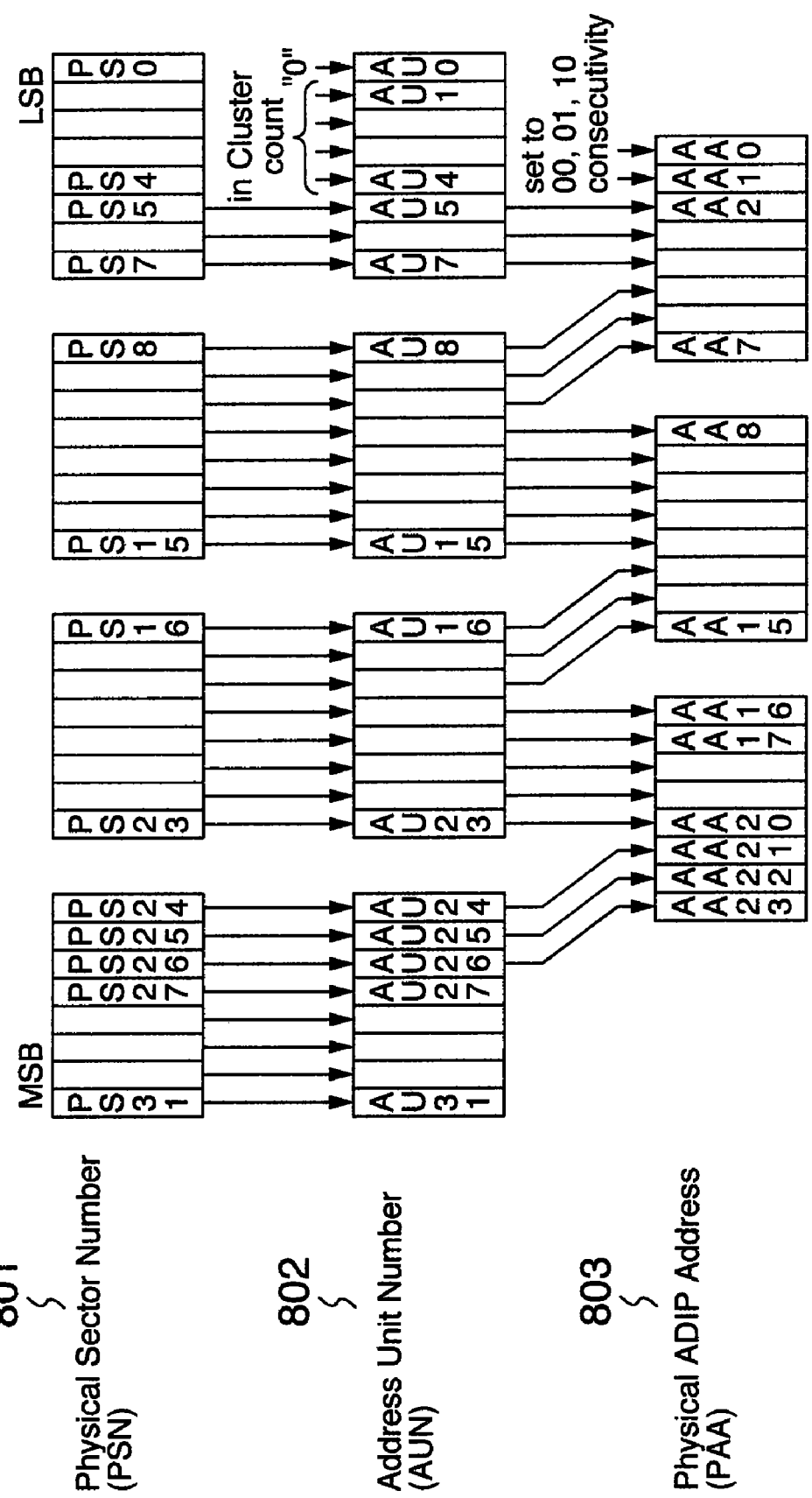

FIG. 8B

|  | sequence number | intra-RUB number |
|---|---|---|
| $PAA_0$ on L0 | AA23 · · AA2 | AA1,AA0 = 00,01,10 from inside to outside |
| $PAA_1$ on L1 | AA23 · · AA2 | AA1,AA0 = 00,01,10 from inside to outside |
| ⋮ | ⋮ | ⋮ |

FIG. 9A
CONVENTIONAL ADIP DATA STRUCTURE 901

| nibble | bit3 | bit2 | bit1 | bit0 | | |
|---|---|---|---|---|---|---|
| n0 | AA23 | AA22 | AA21 | AA20 | ↑ | |
| n1 | AA19 | AA18 | .... | .... | | ADIP address |
| ... | ... | .... | .... | .... | 6 nibbles | |
| n5 | AA3 | .... | .... | AA0 | ↓ | |
| n6 | AA11 | .... | .... | .... | ↑ | |
| ... | .... | .... | .... | .... | 3 nibbles | AUX data |
| n8 | AX3 | .... | .... | AX0 | ↓ | |

FIG. 9B
EXTENDED ADIP DATA STRUCTURE 902

| nibble | bit3 | bit2 | bit1 | bit0 | | |
|---|---|---|---|---|---|---|
| n0 | X | X | X | AA24 | ↑ | |
| n1 | AA23 | AA22 | AA21 | AA20 | | ADIP address |
| ... | .... | .... | .... | .... | 7 nibbles | |
| n5 | AA3 | .... | .... | .... | | |
| n6 | AA3 | AA18 | .... | AA0 | ↓ | |
| n7 | X | X | X | X | ↑ | No data |
| n8 | X | X | X | X | 2 nibbles | |

ADDRESS GENERATING AND DETECTING METHOD AND REPRODUCING AND RECORDING APPARATUS

BACKGROUND

1. Technical Field

The present invention relates to a reproducing and recording apparatus which generates/detects an address in/from a recording medium such as an optical disc having recorded addresses and records/reproduces data on/from the recording medium.

2. Description of the Background Art

In FIGS. 6A and 6B in JP-A-2008-41243, there is shown correlation of address information on a Blu-ray Disc. In the paragraph [0010] in JP-A-2008-41243, there is a description "As shown in FIG. 6, each address unit number (AUN) is associated with a physical sector number and associated with a physical ADIP (Address In Pre-groove) address, so that the AUN is used usefully as reference information for seeking a record position." According to FIGS. 6A and 6B, the physical sector number (PSN) allocated as one address to data in accordance with each sector and the physical ADIP address (PAA) embedded in wobbles have the relation 32*PSN=3*PAA but five bits of bit31 to bit27 of the PSN are not allocated as bits corresponding to the PAA.

SUMMARY

In bit allocation as described in JP-A-2008-41243, the number of bits of PAA to be embedded in wobbles is insufficient when PSN is more than the quantity of data originally expressed in 27 bits.

An object of the invention is to provide an address generating and detecting method and a reproducing and recording apparatus for a recording medium having bit extension and bit allocation of wobble addresses changed.

In order to solve the aforementioned problem, bit allocation identification information of an address is detected from an optical disc and both conventional bit allocation of a wobble address and bit allocation after change are controlled selectively to detect a physical position address on the optical disc.

According to the invention, address detection in a recording medium having bit extension and bit allocation changed can be achieved in addition of address detection in a recording medium having conventional bit allocation.

BRIEF DESCRIPTION OF THE DRAWINGS

FIG. 1 is a diagram of an optical disc recording and reproducing apparatus (Part 1) as a first embodiment of the invention;

FIGS. 2A and 2B are a correlation diagram and table of addresses on a conventional multi-layer optical disc;

FIGS. 3A and 3B are a correlation diagram and table of addresses on a multi-layer optical disc in the first embodiment of the invention;

FIGS. 4A and 4B are a correlation diagram and table (Part 1) of addresses on a multi-layer optical disc in a second embodiment of the invention;

FIGS. 5A and 5B are a correlation diagram and table (Part 2) of addresses on a multi-layer optical disc in the second embodiment of the invention;

FIGS. 6A and 6B are a correlation diagram and table (Part 1) of addresses on a multi-layer optical disc in a third embodiment of the invention;

FIGS. 7A and 7B are a correlation diagram and table (Part 2) of addresses on a multi-layer optical disc in the third embodiment of the invention;

FIGS. 8A and 8B are a correlation diagram and table of addresses on a multi-layer optical disc in a fourth embodiment of the invention;

FIGS. 9A and 9B are ADIP address structure diagrams of the conventional multi-layer optical disc and the multi-layer optical disc in the second embodiment (Part 1) of the invention.

DETAILED DESCRIPTION

Embodiments of the invention will be described below with reference to the drawings.

Figure 3A:
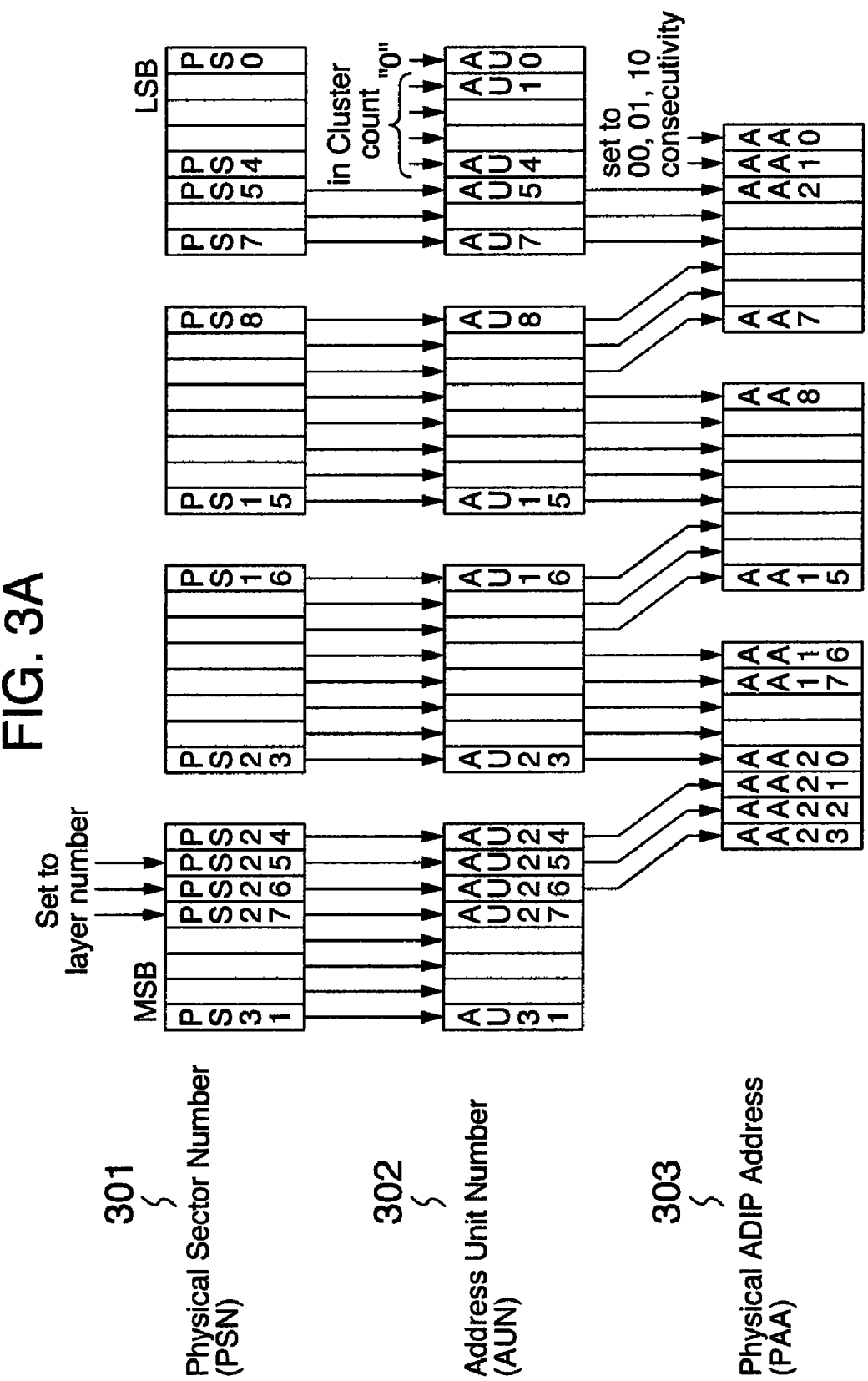

FIG. 1 shows an example of a recording/reproducing apparatus which records/reproduces data on/from an optical disc according to a first embodiment of the invention. The system shown in FIG. 1 includes an optical disc 101, a pickup 102, a spindle motor 103, a first address reproducing circuit 104, a second address reproducing circuit 105, a selection circuit 106, a bit allocation identification circuit 107, a data recording/reproducing circuit 108, an external host 109, and a micro-computer 110 for controlling the system as a whole. Description will be made on the assumption that the optical disc 101 in FIG. 1 is an optical disc having a correlation diagram and table of addresses shown in FIGS. 2A and 2B or FIGS. 3A and 3B. FIGS. 2A and 2B are a correlation diagram and table of addresses in a conventional Blu-ray optical disc of 25 GB per layer. In FIG. 2A, the reference numeral 201 designates physical sector number (hereinafter referred to as PSN) of each sector, the reference numeral 202 designates address unit number (hereinafter referred to as AUN) which is an address embedded in data in accordance with each cluster, and the reference numeral 203 designates physical ADIP address (hereinafter referred to as PAA) based on wobbles. As shown in FIG. 2B, PAA is allocated as a layer number of 3 bits, cluster number (sequence number) of 19 bits and an in-cluster count (intra-RUB number) of 2 bits. Addresses can be allocated to data having a layer number up to eight layers and a data capacity of 32 Gigabytes (64 Kilobytes×$2^{19}$) per layer. It is however impossible to express addresses in a sequence number of 19 bits when the optical disc is a high-density optical disc having a data capacity exceeding 32 Gigabytes per layer. Therefore, an example in which addresses in the sequence number are extended to 20 bits while addresses in the layer number are reduced to 2 bits is shown in FIGS. 3A and 3B. In this case, addresses can be allocated to data having a layer number up to four layers and a data capacity of 64 Gigabytes (64 Kilobytes×$2^{20}$) per layer. When there are a conventional optical disc (FIGS. 2A and 2B) and a high-density optical disc (FIGS. 3A and 3B) though the two are optical discs of the same physical structure, it is necessary to detect addresses in accordance with the two optical discs. Therefore, in the recording/reproducing apparatus shown in FIG. 1, the first address reproducing circuit 104 is formed as address detection based on bit allocation for a conventional optical disc (FIGS. 2A and 2B) while the second address reproducing circuit 105 is formed as address detection based on bit allocation for a high-density optical disc (FIGS. 3A and 3B), so that each detection result is selectively controlled in accordance with the recording capacity per layer read from information on the optical disc.

Figure 10:
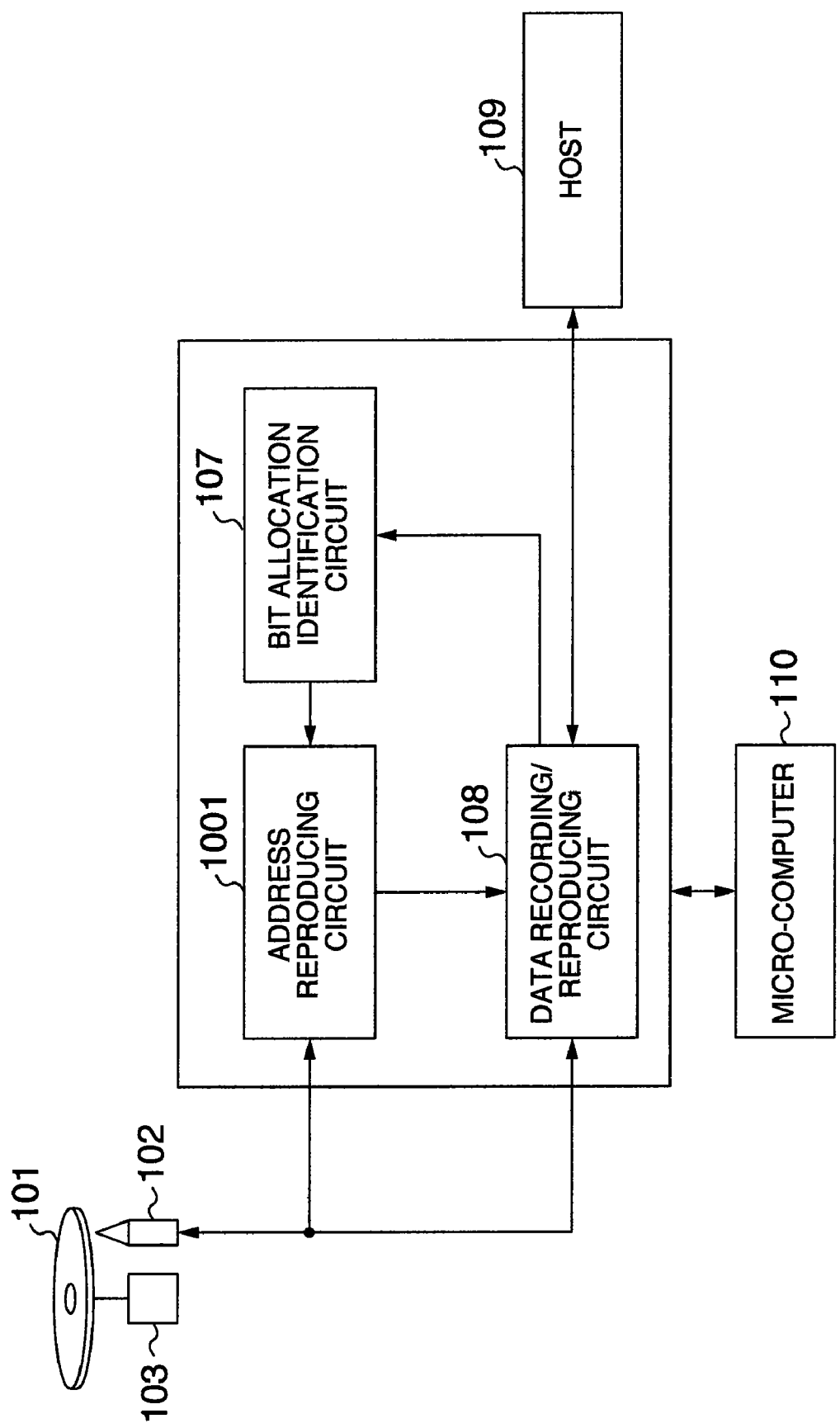
FIG. 10 is a diagram of an optical disc recording and reproducing apparatus (Part 2) as the first embodiment of the invention.

A data recording/reproducing operation in the recording/reproducing apparatus shown in FIG. 1 will be described. A servo signal or media identification information on an optical disc 101 formed by bit allocation shown in FIGS. 2A and 2B or FIGS. 3A and 3B is read from the optical disc 101 through the pickup 102 to thereby determine the medium. Information such as optical disc type, specification version, the number of layers, recording capacity, etc. is read from a BCA region or a disc information region on the inner zone of the optical disc through the data recording/reproducing circuit 108 and stored in the bit allocation identification circuit 107. In this embodiment, information about the recording capacity per layer is stored because the difference between the bit allocation shown in FIGS. 2A and 2B and the bit allocation shown in FIGS. 3A and 3B is caused by the recording capacity per layer. Moreover, a wobble signal read from the optical disc 101 through the pickup 102 is input to the first address reproducing circuit 104 and the second address reproducing circuit 105. Address detection corresponding to bit allocation of the conventional optical disc shown in FIGS. 2A and 2B is performed in the first address reproducing circuit 104. Address detection corresponding to bit allocation of the high-density optical disc shown in FIGS. 3A and 3B is performed in the second address reproducing circuit 105. Therefore, when a detection address is selected by the selection circuit 106 and output from the selection circuit 106 in accordance with the recording capacity information stored in the bit allocation identification circuit 107, a data recording/reproducing position can be detected. Although this embodiment has been described in the case where two address reproducing circuits 104 and 105 are used, this embodiment can be achieved also in the case where only one address reproducing circuit 1001 is used as shown in FIG. 10 so that address conversion of an address of PAA bit23-bit2 in the address reproducing circuit 1001 into a layer number address and a sequence number address is selected in accordance with the recording capacity information stored in the bit allocation identification circuit 107. Although description has been made in the case where address conversion is achieved by hardware processing, address conversion can be achieved also by software processing if the recording capacity information stored in the bit allocation identification circuit 107 is acquired from the micro-computer 110 or the like so that the detected address of PAA bit23-bit2 is converted into a layer number address and a sequence number address by the micro-computer.

As described above, two types of optical discs equal in physical structure but different in address bit allocation can be used because any physical position on each disc can be specified easily in such a manner that the recording capacity per layer is read from each disc and an address detecting method is selected based on the read recording capacity.

Figure 4A:
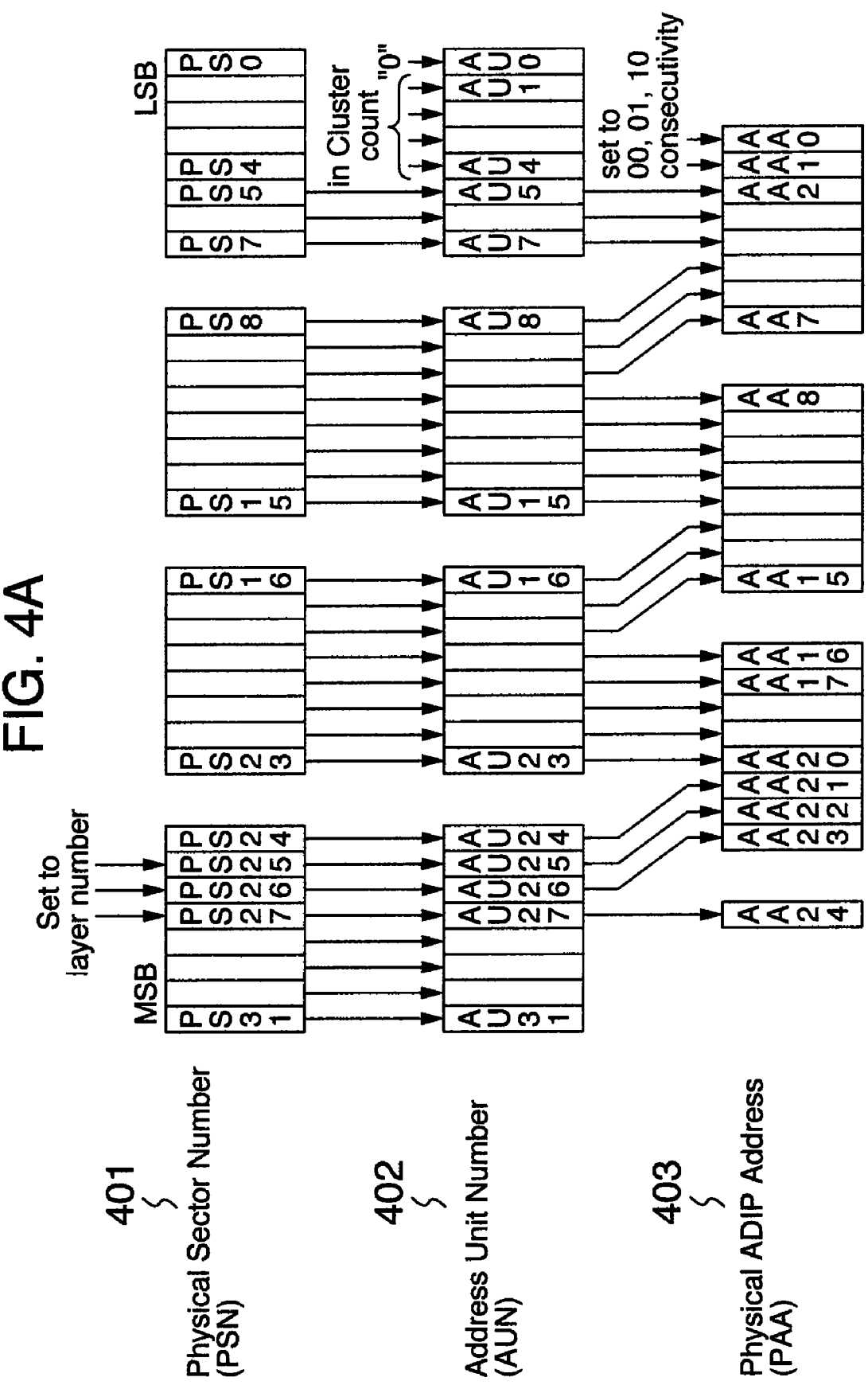

FIGS. 4A and 4B are a correlation diagram and table of addresses on an optical disc 101 used in a recording/reproducing apparatus according to a second embodiment of the invention. Description will be made similarly to the first embodiment in the case where switching between a conventional optical disc (FIGS. 2A and 2B) and a high-density optical disc (FIGS. 4A and 4B) is taken as an example. In FIGS. 4A and 4B, an extended PAA address configuration of 25 bits is formed by adding one bit to the conventional PAA address configuration of 24 bits. When the PAA address is set at 25 bits, it is necessary to modify the address structure embedded in wobbles. FIGS. 9A and 9B show ADIP address-including ADIP data structures. FIG. 9A shows a conventional structure including an ADIP address of 24 bits of PAA bit23-bit0 for supporting bit allocation of PAA address shown in FIGS. 2A and 2B, and AUX data of 12 bits used as an auxiliary area for storing disc information, etc. It is however necessary to keep a data storage region of 1 bit when the PAA address is extended to 25 bits for supporting the high-density optical disc shown in FIGS. 4A and 4B. Therefore, FIG. 9B shows an example of the extended structure in which the auxiliary area is not used as an AUX data area but allocated as an address area simply.

Data recording/reproducing operations of the conventional optical disc (FIGS. 2A and 2B) and the high-density optical disc (FIGS. 4A and 4B) in the recording/reproducing apparatus shown in FIG. 1 will be described. Similarly to the first embodiment, the recording capacity per layer read from the disc 101 is stored in the bit allocation identification circuit 107, and a wobble signal read from the disc 101 through the pickup 102 is input to the first address reproducing circuit 104 and the second address reproducing circuit 105. The first address reproducing circuit 104 performs address detection corresponding to the conventional optical disc indicated by the address structure of 24 bits in FIG. 9A and the bit allocation in FIGS. 2A and 2B. The second address reproducing circuit 105 performs address detection corresponding to the high-density optical disc indicated by the address structure of 25 bits in FIG. 9B and the bit allocation in FIGS. 4A and 4B. Therefore, when a detection address is now selected by the selection circuit 106 and output from the selection circuit 106 in accordance with the recording capacity information stored in the bit allocation identification circuit 107, the position to record/reproduce data can be detected. Although this embodiment shown in FIG. 9B has been described in the case where the place used as the conventional AUX data area is newly used for storing an additional bit in order to keep the storage region of PAA bit24, the invention is not limited to the bit allocation in this embodiment. For example, when the additional bit information is embedded as a special pattern in the AUX data area without storage of the bit itself or the wobble address structure per se is modified to increase the ADIP address storage area to thereby perform reconfiguration, the invention can be achieved likewise.

Figure 5A:
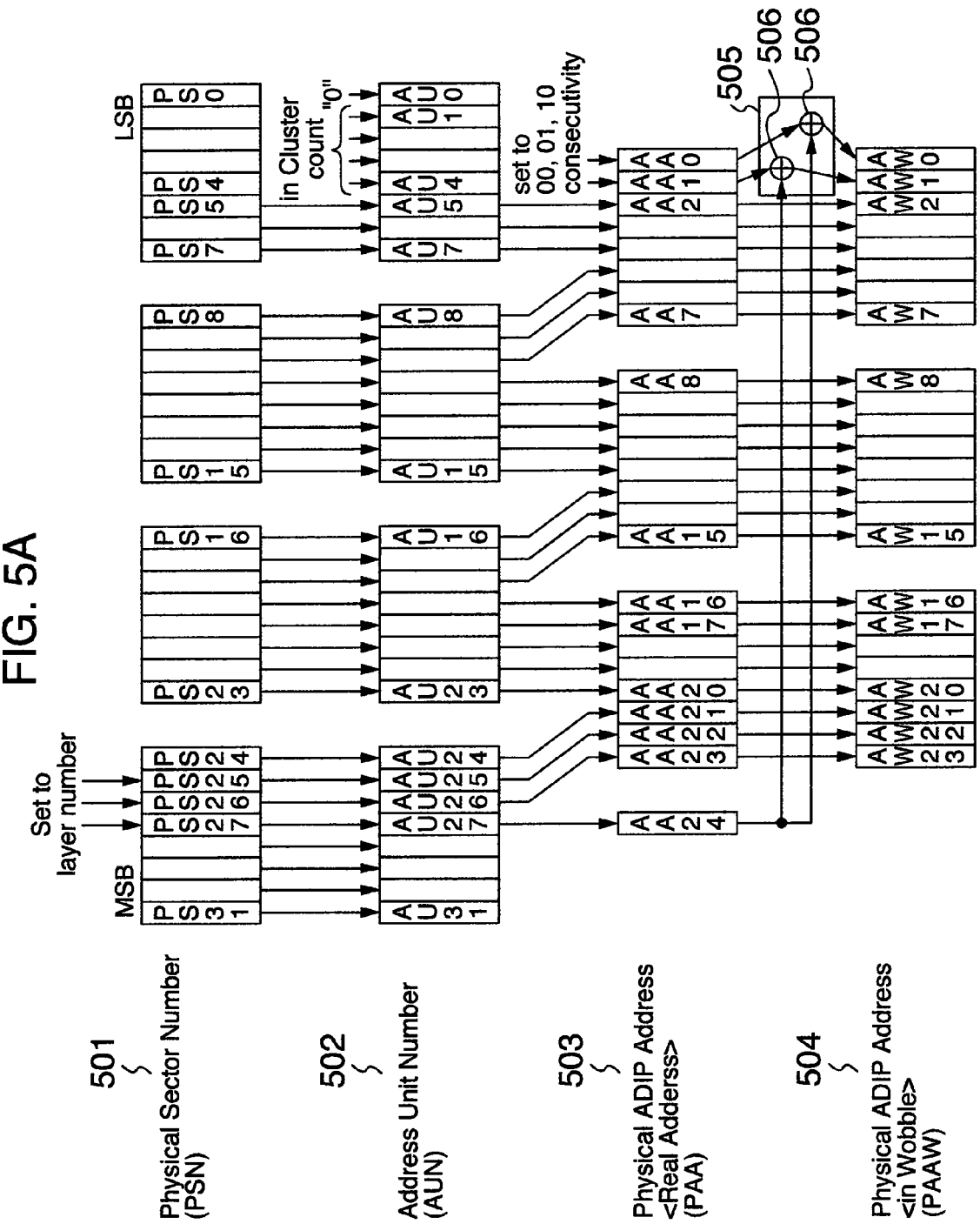

Alternatively, when the address is extended by using a virtual bit as shown in FIGS. 5A and 5B without change of the number of address bits embedded in wobbles, switching to the high-density optical disc can be achieved likewise. In FIGS. 5A and 5B, an address is generated by embedding information of a virtual bit in another bit, so that correlation of address to be restored is used at the time of detection. Specifically, PAA bit24 is input as a control bit for determining the on/off of a scrambling process in a scrambling circuit 505 so that an ADIP address (PAAW 504 in FIG. 5A) after applying the scrambling process to PAA bit1-bit0 as lower 2 bits is embedded in wobbles. For this reason, the address of 24 bits embedded in wobbles is not changed, so that large modification is not required. Therefore, in the same manner, the first address reproducing circuit 104 performs address detection corresponding to the conventional optical disc indicated by the bit allocation shown in FIGS. 2A and 2B, and the second address reproducing circuit 105 performs address detection corresponding to the high-density optical disc indicated by the bit allocation shown in FIGS. 5A and 5B. In the second address reproducing circuit 105, whether scrambling is present or not, is detected based on the consecutivity of lower 2 bits (PAA bit1-bit0) of the ADIP address 504 detected from wobbles so that PAA bit1-bit0 can be obtained by restoration of PAA bit24 and descrambling of PAAW bit1-bit0. Therefore, when the detection address is selected by the selection circuit 106 and output from the selection circuit 106 in accordance with the recording capacity information stored in the bit allocation identification circuit 107, the position to record/ reproduce data can be detected. Incidentally, the number of bits used as virtual bits, the bit arrangement position of virtual bits, the bit position where information such as scramble information is embedded, or the bit position the where an arrangement is converted within address, the bit configuration of an address and the method of embedding information such as scramble information are not limited to this embodiment. These can be also achieved when the second address reproducing circuit 105 is formed as a circuit based on the required address generating method.

As described above, in two types of optical discs equal in physical structure but different in bit allocation of address, the physical position on each disc can be specified easily when the recording capacity per layer is read from each disc and an address detecting method is selected based on the read recording capacity.

FIGS. 6A and 6B are a correlation diagram and table of addresses on an optical disc 101 used in a recording/reproducing apparatus according to a third embodiment of the invention. Description will be made similarly to the first embodiment in the case where switching between a conventional optical disc (FIGS. 2A and 2B) and a high-density optical disc (FIGS. 6A and 6B) is taken as an example. In FIGS. 6A and 6B, bit allocation of sequence number of 20 bits and intra-RUB number of 1 bit is taken as against the conventional bit allocation (FIGS. 2A and 2B) of sequence number of 19 bits and intra-RUB number of 2 bits.

Therefore, data recording/reproducing operations of the conventional optical disc (FIGS. 2A and 2B) and the high-density optical disc (FIGS. 6A and 6B) in the recording/reproducing apparatus shown in FIG. 1 will be described. Similarly to the first embodiment, the recording capacity per layer read from the disc 101 is stored in the bit allocation identification circuit 107, and a wobble signal read from the disc 101 through the pickup 102 is input to the first address reproducing circuit 104 and the second address reproducing circuit 105. The first address reproducing circuit 104 performs address detection corresponding to the conventional optical disc indicated by the bit allocation in FIGS. 2A and 2B. The second address reproducing circuit 105 performs address detection corresponding to the high-density optical disc indicated by the bit allocation in FIGS. 6A and 6B. The second address reproducing circuit 105 specifies the physical position based on the consecutivity of lower 1 bit (PAA bit0) of each ADIP address 603 detected from wobbles. For example, because PAA bit0 is counted as 0, 1, 0, 0, 1, 0, . . . in view of only PAA bit0, the position can be specified based on the consecutivity of adjacent bit0's. Or because PAA bit1-bit0 as lower 2 bits are counted as 0, 1, 0, 2, 3, 2, 0, 1, 0, . . . , address detection and position specification can be made likewise. Therefore, when a detection address is selected by the selection circuit 106 and output from the selection circuit 106 in accordance with the recording capacity information stored in the bit allocation identification circuit 107, the position to record/reproduce data can be detected.

Figure 7A:
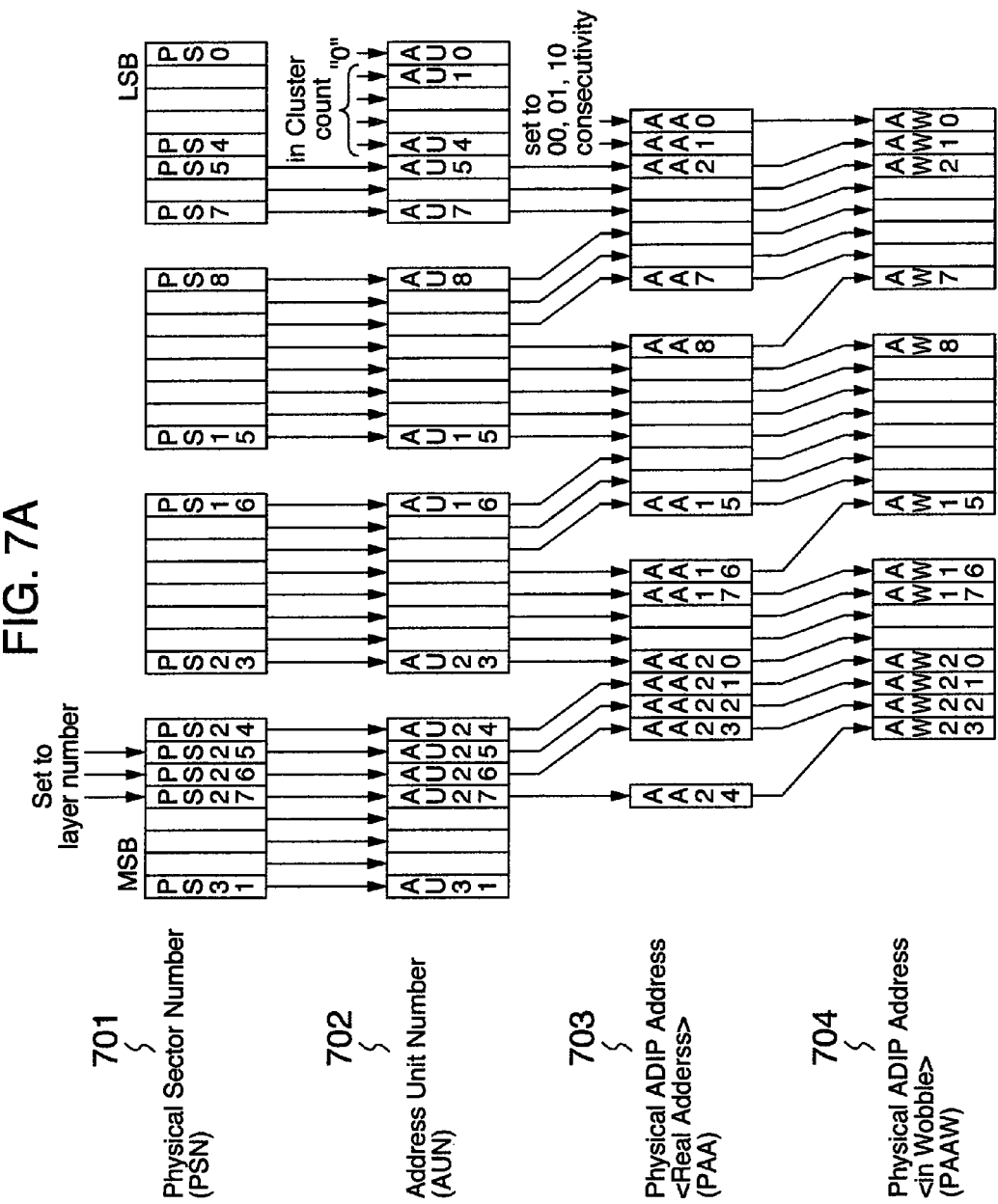

As shown in FIGS. 7A and 7B, when a virtual bit is allocated to PAA bit1 in the same manner as shown in FIGS. 5A and 5B, PAA bit1 can be restored based on the consecutivity of adjacent PAAW bit0's, detection of PAAW bit1-bit0, etc. to thereby achieve address detection.

As described above, two types of optical discs equal in physical structure but different in address bit allocation can be used because any physical position on each disc can be specified easily in such a manner that the recording capacity per layer is read from each disc and an address detecting method is selected based on the read recording capacity.

FIGS. 8A and 8B are a correlation diagram and table of addresses on an optical disc 101 used in a recording/reproducing apparatus according to a fourth embodiment of the invention. Description will be made similarly to the first embodiment in the case where switching between a conventional optical disc (FIGS. 2A and 2B) and a high-density optical disc (FIGS. 8A and 8B) is taken as an example. In FIGS. 8A and 8B, bit allocation of sequence number of 22 bits for numbering addresses of all layers serially is taken as against the conventional bit allocation (FIGS. 2A and 2B) of layer number of 3 bits and sequence number of 19 bits.

Therefore, data recording/reproducing operations of the conventional optical disc (FIGS. 2A and 2B) and the high-density optical disc (FIGS. 8A and 8B) in the recording/reproducing apparatus shown in FIG. 1 will be described. Similarly to the first embodiment, the recording capacity per layer read from the disc 101 is stored in the bit allocation identification circuit 107, and a wobble signal read from the disc 101 through the pickup 102 is input to the first address reproducing circuit 104 and the second address reproducing circuit 105. The first address reproducing circuit 104 performs address detection corresponding to the conventional optical disc indicated by the bit allocation in FIGS. 2A and 2B. The second address reproducing circuit 105 performs address detection corresponding to the high-density optical disc indicated by the bit allocation in FIGS. 8A and 8B. Because the address read in the second address reproducing circuit 105 is allocated as a serial number available for all layers as shown in FIGS. 8A and 8B, an address of layer number and sequence number per layer can be detected easily by calculation using top address information of each layer as offset information. Therefore, when a detection address is selected by the selection circuit 106 and output from the selection circuit 106 in accordance with the recording capacity information stored in the bit allocation identification circuit 107, the position to record/reproduce data can be detected. Although this embodiment has been described in the case where two address reproducing circuits 104 and 105 are used, this embodiment can be achieved similarly to the first embodiment also in the case where only one address reproducing circuit 1001 is used as shown in FIG. 10 so that address conversion of an address of PAA bit23-bit2 in the address reproducing circuit 1001 into a layer number address and a sequence number address is selected in accordance with the recording capacity information stored in the bit allocation identification circuit 107. Although description has been made in the case where address conversion is achieved by hardware processing, address conversion can be achieved also by software processing if the recording capacity information stored in the bit allocation identification circuit 107 is acquired from the micro-computer 110 or the like so that the detected address of PAA bit23-bit2 is converted into a layer number address and a sequence number address by the micro-computer.

As described above, two types of optical discs equal in physical structure but different in address bit allocation can be used because any physical position on each disc can be specified easily in such a manner that the recording capacity per layer is read from each disc and an address detecting method is selected based on the read recording capacity.

Although the embodiments have been described above in the case where a high-density optical disc is used as an example of a disc different in address allocation from the conventional optical disc, the disc is not limited to this specification. For example, the invention can be also applied to two types or plural types of discs substantially equal in physical structure or address storage structure but different in address bit allocation into physical position, such as rewritable discs, write-once discs, single-layer discs, two-layer discs, three-layer or multi-layer discs, etc. In this case, suitable information capable of discriminating difference in address bit allocation may be used as information stored in the bit allocation identification circuit 107.

Although the embodiments have been described in the case where an optical disc is used as a medium and addresses embedded in wobbles are used as addresses, the invention is not limited to the embodiments. Although description has been made while a process of detecting an address embedded in wobbles is taken as an example, it is a matter of course that the thought can be applied to an address generating process such as address generation in accordance with different bit allocations, recording of information for identifying each bit allocation on the disc, etc.

The invention claimed is:

1. An address generating method for a recording medium having an area for recording data regarding structure of recording layers and clusters, and addresses indicating physical recording positions on the recording medium, the addresses including layer number addresses indicating numbers of the recording layers, cluster number addresses indicating data positions of the clusters, and in-cluster count values for counting inside of each of the clusters, the method comprising the steps of:
   generating the addresses based on either of a first bit allocation and a second bit allocation;
   forming the first bit allocation from a layer number address of h bits (h: natural number), a cluster number address of i bits (i: natural number) and a count value of j bits (j: natural number);
   arranging the first bit allocation to an address bit of (h+i+j) bits on the recording medium; and
   forming the second bit allocation from a layer number address of h bits, a cluster number address of (i+k) bits (k: natural number) and a count value of j bits, the second bit allocation having a virtual bit which is not recorded in the recording medium,
   wherein the virtual bit indicates whether a regularity of lower two bits is a repetition of an increment, are used as extended bits of the cluster number addresses, and are arranged to an address bit of (h+i+j) bits on the recording medium by virtually embedding the virtual bit.

2. An address generating method for a recording medium having an area for recording data regarding structure of recording layers and clusters, and addresses indicating physical recording positions on the recording medium, the addresses including layer number addresses indicating numbers of the recording layers, cluster number addresses indicating data positions of the clusters, and in-cluster count values for counting inside of each of the clusters, the method comprising the steps of:
   generating the addresses based on either of a first bit allocation and a second bit allocation;
   forming the first bit allocation from a layer number address of h bits (h: natural number), a cluster number address of i bits (i: natural number) and a count value of j bits (j: natural number);
   arranging the first bit allocation to an address bit of (h+i+j) bits on the recording medium; and
   forming the second bit allocation from a layer number address of h bits, a cluster number address of (i+k) bits (k: natural number) and a count value of j bits, wherein:
   the layer number address is arranged to an address bit of h bits, and
   a part of bits of the cluster number address and the count value is arranged to an address bit of (i+j) bits.

3. An address detecting method for a recording medium having an area for recording data regarding structure of recording layers and clusters, and addresses indicating physical recording positions on the recording medium, the addresses including layer number addresses indicating numbers of the recording layers, cluster number addresses indicating data positions of the clusters, and in-cluster count values for counting inside of each of the clusters, the method comprising the steps of:
   forming a first bit allocation from a layer number address of h bits (h: natural number), a cluster number address of i bits (i: natural number) and a count value of j bits (j: natural number);
   arranging the first bit allocation to an address bit of (h+i+j) bits on the recording medium;
   forming a second bit allocation from a layer number address of h bits, a cluster number address of (i+k) bits (k: natural number) and a count value of j bits, the second bit allocation having a virtual bit which is not recorded in the recording medium, wherein:
   the virtual bits indicates whether a regularity of lower two bits is a repetition of an increment, are used as extended bits of the cluster number addresses, and are arranged to an address bit of (h+i+j) bits on the recording medium by virtually embedding the virtual bit; and
   each address is detected based on either of the first bit allocation and the second bit allocation selected in accordance with bit allocation identification information stored in the recording medium.

4. An address detecting method for a recording medium having an area for recording data regarding structure of recording layers and clusters, and addresses indicating physical recording positions on the recording medium, the addresses including layer number addresses indicating numbers of the recording layers, cluster number addresses indicating data positions of the clusters, and in-cluster count values for counting inside of each of the clusters, the method comprising the steps of:
   forming a first bit allocation from a layer number address of h bits (h: natural number), a cluster number address of i bits (i: natural number) and a count value of j bits (j: natural number);
   arranging the first bit allocation to an address bit of (h+i+j) bits on the recording medium;
   forming a second bit allocation from a layer number address of h bits, a cluster number address of (i+k) bits (k: natural number) and a count value of j bits, wherein:
   the layer number address is arranged to an address bit of h bits;
   a part of bits of the cluster number address and the count value is arranged to an address bit of (i+j) bits; and
   each address is detected based on either of the first bit allocation and the second bit allocation selected in accordance with bit allocation identification information stored in the recording medium.

5. A reproducing apparatus for reproducing data from a recording medium, having an area for recording data regarding structure of recording layers and clusters, and addresses indicating physical recording positions on the recording medium, wherein:
   the addresses include layer number addresses indicating numbers of the recording layers, cluster number addresses indicating data positions of the clusters, and in-cluster count values for counting inside of each of the clusters;

a first bit allocation is formed from a layer number address of h bits (h: natural number), a cluster number address of i bits (i: natural number) and a count value of j bits (j: natural number), and the first bit allocation is arranged to an address bit of (h+i+j) bits on the recording medium;

a second bit allocation is formed from a layer number address of h bits, a cluster number address of (i+k) bits (k: natural number) and a count value of j bits, and the second bit allocation has a virtual bit which is not recorded in the recording medium;

the virtual bit indicates whether a regularity of lower two bits is a repetition of an increment, are used as extended bits of the cluster number addresses, and are arranged to an address bit of (h+i+j) bits on the recording medium by virtually embedding the virtual bit; and data is reproduced from each address detected based on either a detection result of a first address reproducing unit and that of a second address reproducing unit selected in accordance with bit allocation identification information stored in the recording medium.

6. A reproducing apparatus for reproducing data from a recording medium having an area for recording data regarding structure of recording layers and clusters, and addresses indicating physical recording positions on the recording medium, wherein:

the addresses include layer number addresses indicating numbers of the recording layers, cluster number addresses indicating data positions of the clusters, and in-cluster count values for counting inside of each of the clusters;

a first bit allocation is formed from a layer number address of h bits (h: natural number), a cluster number address of i bits (i: natural number) and a count value of j bits (j: natural number), and the first bit allocation is arranged to an address bit of (h+i+j) bits on the recording medium;

a second bit allocation is formed from a layer number address of h bits, a cluster number address of (i+k) bits (k: natural number) and a count value of j bits;

the layer number address is arranged to an address bit of h bits and a part of bits of the cluster number address and the count value is arranged to an address bit of (i+j) bits; and data is reproduced from each address detected based on either a detection result of the first address reproducing unit and that of the second address reproducing unit selected in accordance with bit allocation identification information stored in the recording medium.

7. A recording apparatus for recording data on a recording medium having an area for recording data regarding structure of recording layers and clusters, and addresses indicating physical recording positions on the recording medium, wherein:

the addresses include layer number addresses indicating numbers of the recording layers, cluster number addresses indicating data positions of the clusters, and in-cluster count values for counting inside of each of the clusters;

a first bit allocation is formed from a layer number address of h bits (h: natural number), a cluster number address of i bits (i: natural number) and a count value of j bits (j: natural number), and the first bit allocation is arranged to an address bit of (h+i+j)bits on the recording medium;

a second bit allocation is formed from a layer number address of h bits, a cluster number address of (i+k) bits (k: natural number) and a count value of j bits, and the second bit allocation has a virtual bit which is not recorded in the recording medium;

the virtual bit indicates whether a regularity of lower two bits is a repetition of an increment, are used as extended bits of the cluster number addresses, and are arranged to an address bit of (h+i+j) bits on the recording medium by virtually embedding the virtual bit; and data is recorded on each address detected based on either detection result of a first address reproducing unit and a second address reproducing unit selected in accordance with bit allocation identification information stored in the recording medium.

8. A recording apparatus for recording data on a recording medium having an area for recording data regarding structure of recording layers and clusters, and addresses indicating physical recording positions on the recording medium, wherein:

the addresses include layer number addresses indicating numbers of the recording layers, cluster number addresses indicating data positions of the clusters, and in-cluster count values for counting inside of each of the clusters;

a first bit allocation is formed from a layer number address of h bits (h: natural number), a cluster number address of i bits (i: natural number) and a count value of j bits (j: natural number), and the first bit allocation is arranged to an address bit of (h+i+j) bits on the recording medium;

a second bit allocation is formed from a layer number address of h bits, a cluster number address of (i+k) bits (k: natural number) and a count value of j bits;

the layer number address is arranged to an address bit of h bits and a part of bits of the cluster number address and the count value is arranged to an address bit of (i+j) bits; and data is recorded on each address detected based on either detection result of the first address reproducing unit and the second address reproducing unit selected in accordance with bit allocation identification information stored in the recording medium.

\* \* \* \* \*